United States Patent
Miyake et al.

(10) Patent No.: US 7,672,661 B2
(45) Date of Patent: Mar. 2, 2010

(54) MANAGEMENT SERVER AND MOBILE TERMINAL

(75) Inventors: Motoharu Miyake, Yokosuka (JP); Hiroshi Inamura, Yokohama (JP); Takashi Yoshikawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 311 days.

(21) Appl. No.: 11/255,013

(22) Filed: Oct. 21, 2005

(65) Prior Publication Data

US 2006/0094414 A1 May 4, 2006

(30) Foreign Application Priority Data

Oct. 22, 2004 (JP) ............................ P2004-308811

(51) Int. Cl.
*H04M 11/00* (2006.01)
*H04M 15/00* (2006.01)
*H04J 1/02* (2006.01)

(52) U.S. Cl. .................. 455/406; 370/493; 379/121.01
(58) Field of Classification Search ......... 455/406–408, 455/432.1, 440, 436, 442
See application file for complete search history.

(56) References Cited

U.S. PATENT DOCUMENTS

| | | | |
|---|---|---|---|
| 5,889,777 A * | 3/1999 | Miyao et al. ........... 370/395.52 |
| 6,154,650 A * | 11/2000 | Abidi et al. .................. 455/433 |
| 6,256,504 B1 | 7/2001 | Tell et al. | |
| 6,373,931 B1 * | 4/2002 | Amin et al. ............. 379/121.01 |
| 6,496,689 B1 * | 12/2002 | Keller et al. ................. 455/406 |
| 6,574,489 B1 | 6/2003 | Uriya | |
| 7,184,765 B1 * | 2/2007 | Birnie et al. .............. 455/432.3 |
| 7,436,942 B2 * | 10/2008 | Hakala et al. .......... 379/114.22 |
| 2003/0027595 A1 * | 2/2003 | Ejzak ......................... 455/560 |

FOREIGN PATENT DOCUMENTS

| | | |
|---|---|---|
| CN | 1215532 A | 4/1999 |
| JP | 6-343189 | 12/1994 |
| JP | 9-130476 | 5/1997 |
| JP | 11-285066 | 10/1999 |
| JP | 2000-101723 | 4/2000 |
| JP | 2003-319454 | 11/2003 |
| WO | WO 97/38538 | 10/1997 |
| WO | WO 03/103259 A1 | 12/2003 |

* cited by examiner

*Primary Examiner*—Nick Corsaro
*Assistant Examiner*—Joel Ajayi
(74) *Attorney, Agent, or Firm*—Oblon, Spivak, McClelland, Maier & Neustadt, L.L.P.

(57) ABSTRACT

A management server includes a determination unit and a notification unit. The determination unit determines a communication network to which a mobile terminal connectable to a plurality of the communication networks by one telephone number is connecting. The notification unit issues a notice on the communication network connecting to the mobile terminal based on a result of the determination by the determination unit.

4 Claims, 3 Drawing Sheets

MANAGEMENT SERVER AND MOBILE TERMINAL

CROSS REFERENCE TO RELATED APPLICATIONS

This application is based upon and claims the benefit of priority from prior Japanese Patent Application P2004-308811 filed on Oct. 22, 2004; the entire contents of which are incorporated by reference herein.

BACKGROUND OF THE INVENTION

1. Field of the Invention

The present invention relates to a management server for managing communication by a mobile terminal, and to the mobile terminal.

2. Description of the Related Art

Heretofore, different telephone numbers have been used for different communication networks to which a mobile terminal (terminal device) connects. In recent years, a "one number" service to give one telephone number to one user has been proposed (for example, refer to Japanese Patent Laid-Open Publication H09-130476 (published in 1997)). The one number service has an advantage in that the terminal device can originate and receive a call by using the same telephone number no matter which communication network the terminal device may connect to, thus making it possible to enhance convenience for the user.

However, a new problem to be described below has occurred when it has been attempted to apply the one number service to mobile communication in which the communication network to which the terminal device connects is changed owing to a movement and the like of the terminal device during the communication. For example, when the mobile terminal uses one telephone number in both of the case of connecting to a mobile communication network and the case of connecting to a wireless LAN, the communication network to which the mobile terminal is connecting to use the communication network concerned cannot be determined based on the telephone number.

Accordingly, for example, the user cannot grasp that a subject to be charged has been changed from the user himself/herself to the other end of the communication or from the other end of the communication to the user him/herself based on the change of the communication network to which the mobile terminal connects owing to the movement and the like thereof. Hence, there is a possibility that the user does not know the subject to be charged, and cannot make the communication with peace in mind.

In this connection, in consideration of the above-described problem, it is an object of the present invention to provide a management server and a mobile terminal, which make it possible for a user of a mobile terminal connectable to plural communication networks by using one telephone number to grasp a communication network to which the mobile terminal is connecting.

SUMMARY OF THE INVENTION

A first aspect of the present invention is to provide a management server, including: (A) a determination unit configured to determine a communication network to which a mobile terminal connectable to a plurality of the communication networks by one telephone number is connecting; and (B) a notification unit configured to issue a notice on the communication network connecting to the mobile terminal based on a result of the determination by the determination unit.

A second aspect of the present invention is to provide a mobile terminal, including: (A) a radio unit connectable to a plurality of communication networks by one telephone number and configured to make wireless communication; (B) a determination unit configured to determine the communication network to which the radio unit is connecting; and (C) an output unit configured to output a result of the determination by the determination unit.

DETAILED DESCRIPTION OF THE INVENTION

Figure 1:
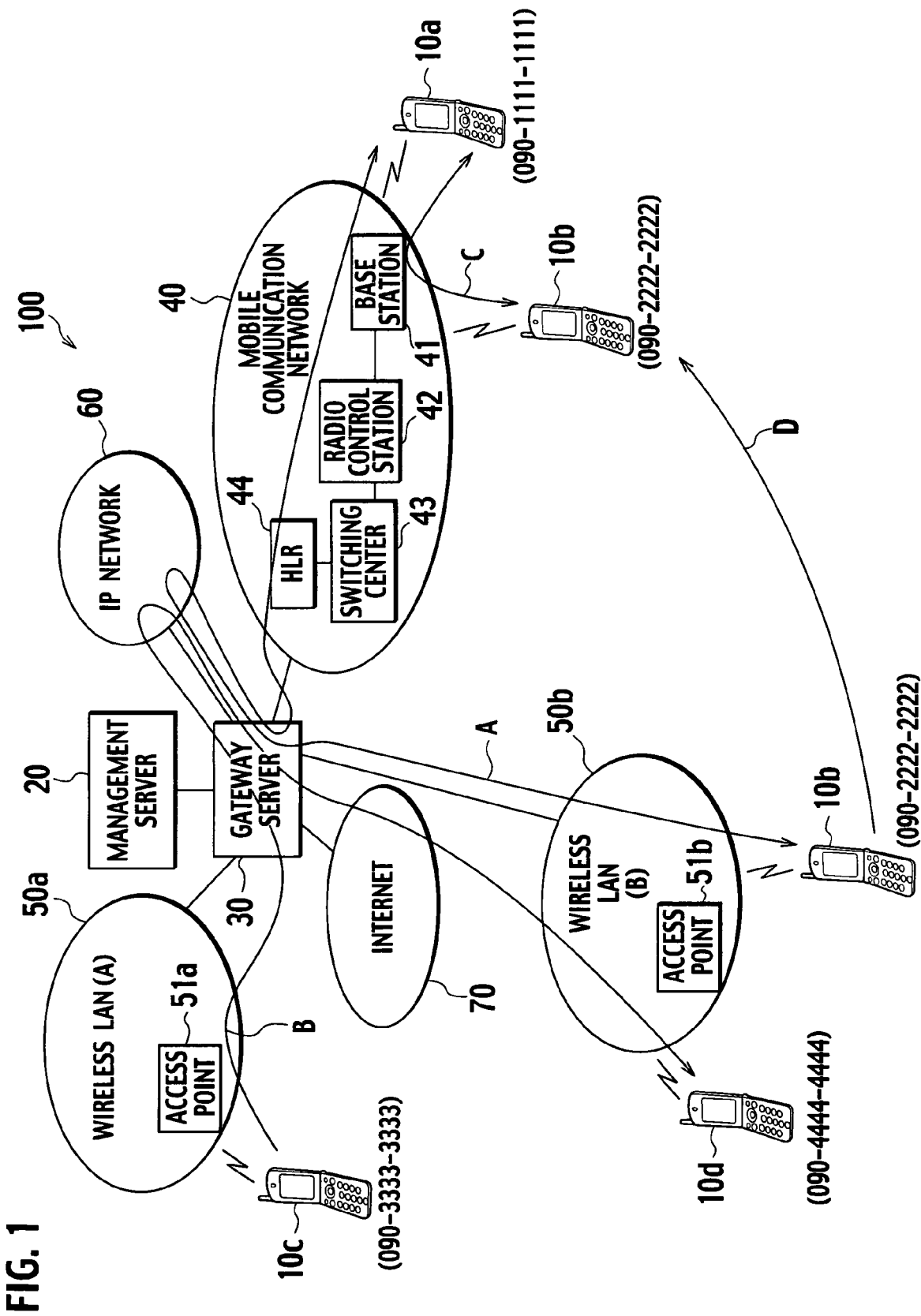
FIG. 1 is a view showing a configuration of a mobile communication system according to an embodiment of the present invention.

Various embodiments of the present invention will be described with reference to the drawings. It is to be noted that the same or similar reference numerals are applied to the same or similar parts and elements throughout the drawings, and the description of the same or similar parts and elements will be omitted or simplified.

As shown in FIG. 1, a communication system 100 includes plural mobile terminals 10a to 10d, a management server 20, a gateway server 30, and plural communication networks.

The communication system 100 includes, as the plural communication networks, a mobile communication network 40, a wireless LAN (A) 50a, a wireless LAN (B) 50b, an internet protocol (IP) network 60, the Internet 70, and the like. The communication networks are connected to one another through the gateway server 30. The gateway server 30 relays communication among the communication networks.

In particular, the mobile communication network 40 includes a base station 41, a radio control station 42, a switching center 43, and a home location register (HLR) 44. The base station 41 connects to the mobile terminals by wireless communications. The radio control station 42 controls the wireless communications between the base station 41 and the mobile terminals. The switching center 43 controls a call origination from the mobile terminal and a call reception on the mobile terminal. The HLR 44 stores subscriber information regarding users of the mobile terminals, positional information of the mobile terminals 10a to 10d, and the like.

Moreover, the wireless LAN (A) 50a and the wireless LAN (B) 50b include access points 51a and 51b, respectively. The access points 51a and 51b connect to the mobile terminals 10a to 10d by the wireless communications.

The management server 20 manages the communications made by the mobile terminals 10a to 10d. The management server 20 connects to the respective communication networks through the gateway server 30. The management server 20 issues notices, to the mobile terminals 10a to 10d, on the communication networks (hereinafter, referred to as "connection networks") to which the mobile terminals 10a to 10d connect.

Each of the mobile terminals 10a to 10d is connectable to the plural communication networks by one telephone number. The one telephone number (telephone number shown in parentheses in FIG. 1) is given to each of the mobile terminals 10a to 10d. Each of the mobile terminals 10a to 10d is connectable, for example, to any of the mobile communication network 40, the wireless LAN (A) 50a, and the wireless LAN (B) 50b by using the one telephone number thus given thereto. Moreover, each of the mobile terminals 10a to 10d can use the same telephone number even after switching the connection network during the communication owing to a movement thereof and the like.

Figure 2:
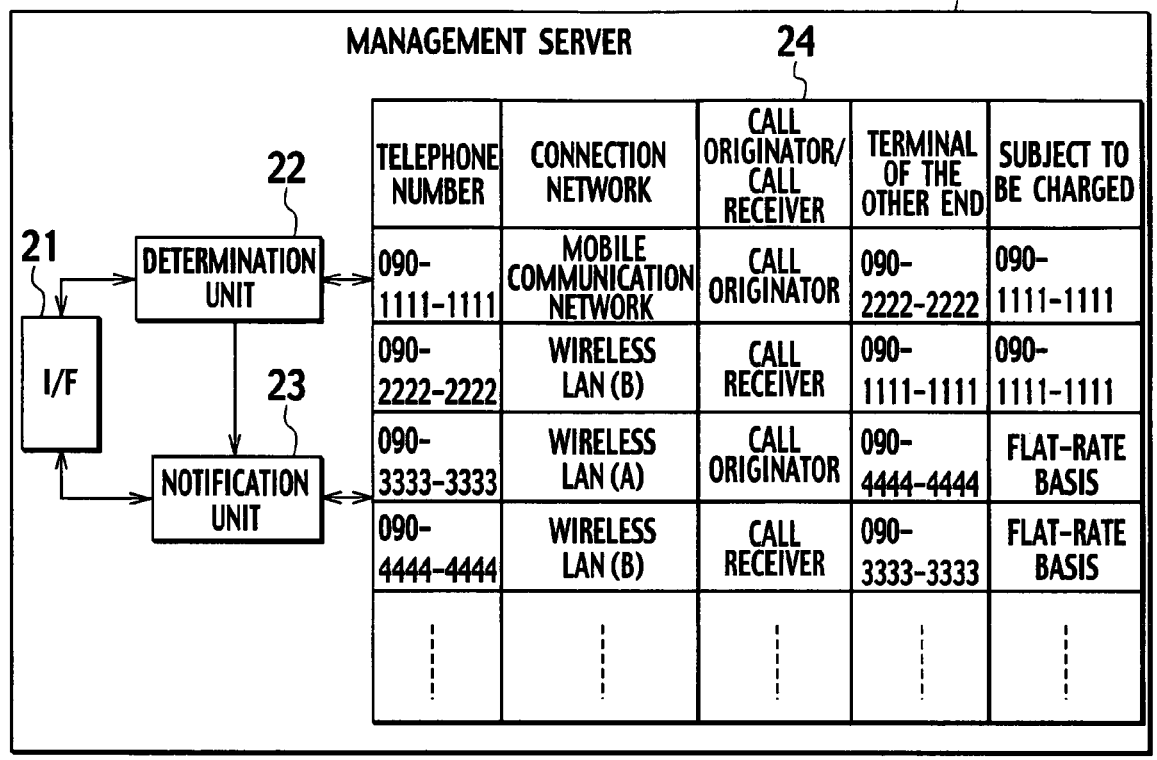
FIG. 2 is a block diagram showing a configuration of a management server according to the embodiment of the present invention.

Next, the management server 20 will be described more in detail. As shown in FIG. 2, the management server 20 includes an interface (hereinafter, referred to as an "I/F") 21, a determination unit 22, a notification unit 23, and a communication information storage unit 24.

The I/F 21 is an interface with the gateway server 30. The communication information storage unit 24 stores information (hereinafter, referred to as "communication information") regarding the communications made by the mobile terminals. The communication information storage unit 24 stores, as such communication information, the communication network (connection networks) to which each mobile terminal connects, a fact as to whether the mobile terminal is a call originator or a call receiver, a telephone number of the terminal (hereinafter, referred to as "the other end terminal") of the other end of the communication to the mobile terminal, a subject to be charged with a fee generated by the communication in association with the telephone number of the mobile terminal.

The determination unit 22 determines the communication network (connection network) to which the mobile terminal connectable to the plural communication networks by one telephone number connects. For example, the determination unit 22 acquires the telephone numbers of the mobile terminals connecting to the mobile communication network 40, the wireless LAN (A) 50a, and the wireless LAN (B) 50b through the gateway server 30 from the switching center 43 of the mobile communication network 40 and the access points 51a and 51b of the wireless LAN (A) 50a and the wireless LAN (B) 50b, and determines the connection network.

In the case where the communication has already been started, the determination unit 22 also acquires the fact as to whether the mobile terminal is the call originator or the call receiver from the switching center 43 and the access points 51a and 51b.

For example, the determination unit 22 can issue requests information regarding the mobile terminals connecting thereto to the switching center 43 and the access points 51a and 51b, and can acquire the information therefrom based on responses to the requests. Alternatively, the switching center 43 and the access points 51a and 51b may issue notices on the information to the management server 20 when new terminals connect to the mobile communication network 40, the wireless LAN (A) 50a and the wireless LAN (B) 50b, when the communication is started, or periodically, and the determination unit 22 may acquire the information therefrom based on the notices as described above.

Moreover, the determination unit 22 determines a mobile terminal to be charged. First, the determination unit 22 determines whether the charge is on an as-used basis or a flat-rate basis. When the connection network is the mobile communication network 40, the determination unit 22 determines that the charge is on the as-used basis. When the communication network is the wireless LAN (A) 50a or the wireless LAN (B) 50b, the determination unit 22 determines that the charge is on the flat-rate basis.

When determining that the charge is on the as-used basis, the determination unit 22 determines the mobile terminal to be charged. When the connection network is the mobile communication network 40, the determination unit 22 basically determines that the mobile terminal as the call originator is the subject to be charged. However, when the mobile terminal as the call receiver connects to the mobile communication network 40 and requests a transfer of its own communication to the mobile communication network 40, the determination unit 40 determines that the mobile terminal as the call receiver is the subject to be charged. The determination unit 22 can acquire information regarding such a transfer request from the switching center 43.

As described above, the determination unit 22 determines the connection network, the subject to be charged, and the like based on the information acquired from the switching center 43 and the access points 51a and 51b, and registers results of the determinations in the communication information storage unit 24. Hence, in the communication information storage unit 24, such results of the determinations by the determination unit 22 are registered as the communication information.

For example, in FIG. 1, the mobile terminal 10a connects to the mobile communication network 40, the mobile terminal 10b connects to the wireless LAN (B), and the mobile terminal 10a originates the call to the mobile terminal 10b. In such a way, a voice communication, a television telephone communication, and the like through the mobile communication network 40, the IP network 60, and the wireless LAN (B) 50b are performed (arrow A in FIG. 1). In this case, a speech communication according to a line switching system is made from the mobile communication network 40 to the gateway server 30, and a speech communication by IP telephones of a packet switching system is made from the gateway server 30 to the IP network 60 and the wireless LAN (B) 50b.

In this case, in association with "090-1111-1111" as a telephone number of the mobile terminal 10a, the determination unit 22 registers "the mobile communication network" as the connection network, "the call originator", "090-2222-2222" as a telephone number of the terminal of the other end, and "090-1111-1111" as the subject to be charged, in the communication information storage unit 24. Moreover, in association with "090-2222-2222" as the telephone number of the mobile terminal 10b, the determination unit 22 registers "the wireless LAN (B)" as the connection network, "the call receiver", "090-1111-1111" as the telephone number of the terminal of the other end, and "090-1111-1111" as the subject to be charged, in the communication information storage unit 24.

Moreover, in FIG. 1, the mobile terminal 10c connects to the wireless LAN (A) 50a, the mobile terminal 10d connects to the wireless LAN (B) 50b, and the mobile terminal 10c originates the call to the mobile terminal 10d. In such a way, a voice communication, a television telephone communication, and the like through the wireless LAN (A) 50a, the IP network 60, and the wireless LAN (B) 50b are performed (arrow B in FIG. 1). In this case, a speech communication by the IP telephones of the packet switching system is made from the wireless LAN (A) 50a to the wireless LAN (B) 50b.

In this case, in association with "090-3333-3333" as a telephone number of the mobile terminal 10c, the determination unit 22 registers "the wireless LAN (A)" as the connection network, "the call originator", "090-4444-4444" as a telephone number of the terminal of the other end, and "the flat-rate basis" applied to the subject to be charged, in the communication information storage unit 24. Moreover, in association with "090-4444-4444" as the telephone number of the mobile terminal 10*d*, the determination unit 22 registers "the wireless LAN (B)" as the connection network, "the call receiver", "090-3333-3333" as the telephone number of the terminal of the other end, and "the flat-rate basis" applied to the subject to be charged, in the communication information storage unit 24.

Moreover, the determination unit 22 detects that the mobile terminal has connected to the communication network, and that the mobile terminal has switched the connection network. When performing the above-described registration in the communication information storage unit 24 based on the information acquired from the switching center 43 and the access points 51*a* and 51*b*, the determination unit 22 searches the communication information storage unit 24, and determines whether or not the communication information regarding the mobile terminals of which information has been acquired has already been registered in the communication information storage unit 24.

When the communication information is not registered, the determination unit 22 determines that a mobile terminal is newly connected to the communication network. Meanwhile, when the communication information is registered, the determination unit 22 determines whether or not the connection network is changed. When the connection network is changed, the determination unit 22 determines that the mobile terminal has switched the connection network.

For example, in some cases, owing to the movement of the mobile terminal 10*b* connecting to the wireless LAN (B) 50*b*, deterioration of radio wave conditions, and the like, the mobile terminal 10*b* performs handover (arrow D in FIG. 1) to switch the connection from the wireless LAN (B) 50*b* to the mobile communication network 40, and requests the transfer as described above to the mobile communication network 40. In such a way, both of the mobile terminal 10*a* and the mobile terminal 10*b* connect to the mobile communication network 40, and make the communication (arrow C in FIG. 1) with each other.

In this case, since the connection network of the mobile terminal 10*b* is changed from the wireless LAN (B) 50*b* to the mobile communication network 40, the determination unit 22 determines that the mobile terminal 10*b* has switched the connection network. Moreover, the determination unit 22 determines that the subject to be charged has been changed to the mobile terminal 10*b* as the call receiver, which requests the transfer to the mobile communication network 40. Then, the determination unit 22 updates the communication information storage unit 24. Specifically, the determination unit 22 updates the subject to be charged, which is associated with "090-1111-1111" as the telephone number of the mobile terminal 10*a*, to "090-2222-2222". Moreover, the determination unit 22 updates the connection network associated with "090-2222-2222" as the telephone number of the mobile terminal 10*b* to "the mobile communication network", and updates the subject to be charged to "090-2222-2222".

The determination unit 22 detects the new connection and the switching of the connection network, and inputs results of the detections to the notification unit 23.

The notification unit 23 issues the notices, to the mobile terminals, on the communication networks (connection networks) connected to the mobile terminals based on the results of the determinations by the determination unit 22. The notification unit 23 instructs output methods in the mobile terminals, which correspond to the connection networks, thus making it possible to issue the notices on the connection networks. For example, the notification unit 23 presets an output method representing a combination of the connection network of the mobile terminal as the call originator and the connection network of the mobile terminal as the call receiver. Specifically, the notification unit 23 can preset different output methods depending on the case where the connection network of the call originator is the wireless LAN (B) 50*b* and the connection network of the call receiver is the mobile communication network 40, the case where the connection network of the call receiver is the wireless LAN (B) 50*b* and the connection network of the call originator is the mobile communication network 40, and the case where both of the connection networks of the call originator and the call receiver are the wireless LAN (B) 50*b*, and the case where both of the connection networks of the call originator and the call receiver are the mobile communication network 40. Then, the notification unit 23 can instruct the output methods. The notification unit 23 can preset voice contents and image contents as the output methods.

For example, the voice contents can be preset as follows. The voice contents in the case where the connection network of the call originator is the wireless LAN (B) 50*b* and the connection network of the call receiver is the mobile communication network 40 can be preset as "pipipii". The voice contents in the case where the connection network of the call receiver is the wireless LAN (B) 50*b* and the connection network of the call originator is the mobile communication network 40 can be preset as "piipipi". The voice contents in the case where both of the connection networks of the call originator and the call receiver are the wireless LAN (B) 50*b* can be preset as "pipipipi". The voice contents in the case where both of the connection networks of the call originator and the call receiver are the mobile communication network 40 can be preset as "pipiipipii".

The notification unit 23 creates control signals for issuing the notices on the connection networks to the mobile terminals with reference to the communication information storage unit 24 in which the results of the determinations by the determination units 22 are registered, thereby issuing the notices. For example, the notification unit 23 creates control signals for instructing the above-described output methods in the mobile terminals, which correspond to the connection networks.

Moreover, it is preferable that the notification unit 23 issue the notices when it has been detected by the determination unit 22 that the mobile terminal has connected to the communication network and the mobile terminal has switched the connection network. The notification unit 23 acquires results of the detections of the new connection and the switching of the connection network from the determination unit 22. Then, upon acquiring the results of the detections, the notification unit 23 creates the control signals with reference to the communication information storage unit 24. Note that the notification unit 23 may issue the notices periodically, or may issue such a notice upon receiving the request from the mobile terminal.

The notification unit 23 may instruct the different output methods (different voice and image contents) depending on notification timing. Moreover, the notification unit 23 may issue the notices not only on the communication networks but also that the mobile terminal has connected to the communication network and that the mobile terminal has switched the communication network.

The notification unit 23 may issue the notices to both of the mobile terminal of the call originator and the mobile terminal of the call receiver, may issue the notice only to the mobile terminal as the subject to be charged, or may issue the notice only to the mobile terminal requesting the notice. When the notice is issued only to the subject to be charged, the notification unit 23 detects the mobile terminal becoming the subject to be charged with reference to the communication information storage unit 24. The notification unit 23 creates the control signal only for the detected mobile terminal, and issues the notice on the connection network thereto. Alternatively, the notification unit 23 may issue the notices, to the mobile terminal becoming the subject to be charged, not only on the connection network but also that the mobile terminal concerned is the subject to be charged.

Figure 3:
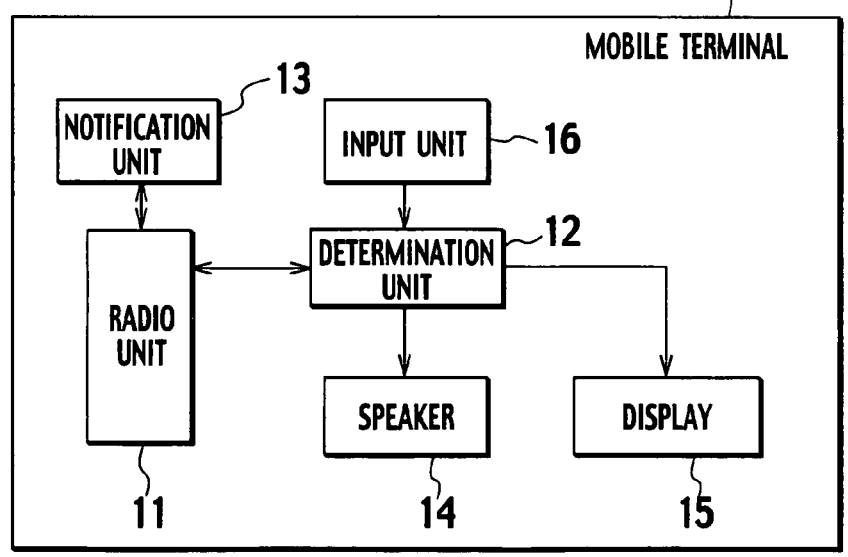
FIG. 3 is a block diagram showing a configuration of a mobile terminal according to the embodiment of the present invention.

Next, the mobile terminals 10a to 10d will be described more in detail. As shown in FIG. 3, the mobile terminal 10a includes a radio unit 11, a determination unit 12, a notification unit 13, a speaker 14, a display 15 and an input unit 16. The mobile terminals 10b to 10d also have similar configurations to the above.

The radio unit 11 is connectable to the plural networks by one telephone number, and makes wireless communication. The radio unit 11 connects to the base station 41 by the wireless communication, and thus connects to the mobile communication network 40. The radio unit 11 connects to the access points 51a and 51b by the wireless communications, and thus connects to the wireless LAN (A) 50a and the wireless LAN (B) 50b.

The determination unit 12 determines the communication network (connection network) to which the radio unit 11 connects. The determination unit 12 detects, from the radio unit 11, the communication network to which the radio unit 11 connects, and determines the connection network for the radio unit 11. For example, there is a case where a connection is established between the mobile terminal 10a and the mobile communication network 40 owing to a temporal deterioration of the radio wave conditions, and the like though the user of the mobile terminal 10a desires a connection to the wireless LAN (B) 50b on the flat-rate basis. In this case, the determination unit 12 detects, from the radio unit 11, the communication network to which the radio unit 11 actually connects, and makes the determination.

The determination unit 12 may also determine the communication network to which the terminal of the other end connects. For example, the determination unit 12 acquires, from the terminal of the other end through the radio unit 11, a control signal issuing the notice on the connection network of the terminal of the other end, and determines the connection network of the terminal of the other end based on the control signal.

Moreover, the determination unit 12 may acquire the control signal issuing the notice on the connection network from the management server 20 through the radio unit 11, and may determine the connection network of the radio unit 11 and the connection network of the terminal of the other end based on the control signal. For example, when the determination unit 12 has acquired the control signal issuing the notice on the connection networks of the call originator and the call receiver, the determination unit 12 can determine the connection network of the radio unit 11 and the connection network of the terminal of the other end based on the fact as to whether the radio unit 11 has originated the call or has received the call and based on the control signal.

Moreover, the determination unit 12 may determine whether or not the subject to be charged is the mobile terminal 1a itself. First, the determination unit 12 determines whether the charge is on the flat-rate basis or the as-used basis. The determination unit 12 determines that the charge is on the as-used basis when the connection network of the radio unit 11 is the mobile communication unit 40, and determines that the charge is on the flat-rate basis when the connection network of the radio unit 11 is the wireless LAN (A) 50a or the wireless LAN (B) 50b.

When determining that the charge is on the as-used basis, the determination unit 12 determines that the subject to be charged is the mobile terminal 10a itself. Basically, the determination unit 12 determines that the mobile terminal 10a is the subject to be charged when the radio unit 11 originates the call. Even when the radio unit 11 receives the call, when the radio unit 11 requests the transfer to the mobile communication network 40, the determination unit 12 determines that the mobile terminal 10a is the subject to be charged.

Moreover, the determination unit 12 detects that the radio unit 11 has connected to the communication network and that the radio unit 11 and the terminal of the other end have switched the connection networks. The determination unit 12 detects from the radio unit 11 that the radio unit 11 has connected to the communication network and has switched the communication network. The determination unit 12 can acquire, from the terminal of the other end through the radio unit 11, a control signal issuing the notice on the connection network of the terminal of the other end, and can detect that the terminal of the other end has switched the connection network based on the control signal. Alternatively, the determination unit 12 may acquire the control signal issuing the connection network from the management server 20 through the radio unit 11, and may detect that the radio unit 11 and the terminal of the other end have switched the connection networks based on the control signal.

The determination unit 12 creates a control signal representing a result of the determination, and inputs the control signal to the speaker 14 and the display 15. As in the notification unit 23 of the management server 20, the determination unit 12 can create a control signal that instructs an output method corresponding to the connection networks as the control signal representing the result of the determination. Specifically, the determination unit 12 presets an output method representing a combination of the connection network of the mobile terminal as the call originator and the connection network of the mobile terminal as the call receiver. Then, the determination unit 12 can create the control signal that instructs the output method in response to a fact as to which of the radio unit 11 and the terminal of the other end is the call originator or the call receiver, and in response to the connection network of the radio unit 11 and the connection network of the terminal of the other end.

The determination unit 12 can preset, as the output method, the voice contents which the speaker 14 is allowed to output, and the image contents which the display 15 is allowed to display. Note that, when having acquired the control signal that instructs the output method corresponding to the connection networks from the management server 20, the determination unit 12 can input the control signal concerned as the control signal representing the result of the determination to the speaker 14 and the display 15. Moreover, the determination unit 12 may create a control signal representing a result of determination for the connection network of the mobile terminal 10a itself.

It is preferable that, when having detected that the radio unit 11 has connected to the communication network, and that the radio unit 11 and the terminal of the other end have switched the connection networks, the determination unit 12 create the control signal representing the result of the determination, and input the control signal to the speaker 14 and the display 15. Note that the determination unit 12 may create the control signal periodically, followed by input thereof, or may create the control signal upon receiving a request from the input unit 16 by the user of the mobile terminal 10*a*.

Moreover, the determination unit 12 may create the different output methods (different voice and image contents) depending on notification timing. Furthermore, the determination unit 12 may create a control signal representing not only the result of the determination regarding the connection network but also that the mobile terminal 10*a* has connected to the communication network and has switched the connection network.

Furthermore, the determination unit 12 may create and input the control signal when the mobile terminal 10*a* is the subject to be charged. Alternatively, the determination unit 12 may create a control signal representing not only the result of the determination regarding the connection network but also that the mobile terminal 10*a* is the subject to be charged.

The speaker 14 and the display 15 are output units for outputting the result of the determination by the determination unit 12. The speaker 14 outputs the result of the determination by voice. The display 15 outputs the result of the determination by image. The speaker 14 and the display 15 receive the control signal representing the result of the determination from the determination unit 12. The speaker 14 outputs the voice representing the result of the determination in accordance with the control signal inputted thereto. The display 15 outputs the image representing the result of the determination in accordance with the control signal inputted thereto.

It is preferable that the speaker 14 and the display 15 output the result of the determination when it has been detected by the determination unit 12 that the radio unit 11 has connected to the communication network and that the radio unit 11 and the terminal of the other end have switched the connection networks. Note that the speaker 14 and the display 15 may output the result of the determination periodically, or may output the result of the determination upon receiving the request from the input unit 16 by the user of the mobile terminal 10*a*. Alternatively, the display 15 may always output the image representing the result of the determination.

Moreover, the speaker 14 and the display 15 may output different voices and images depending on the notification timing. Furthermore, the speaker 14 and the display 15 may output not only the voice and the image which issue the notices on the result of the determination regarding the connection network but also the voice and the image which issue the notices that the mobile terminal 10*a* has connected to the communication network and has switched the connection network.

Furthermore, the speaker 14 and the display 15 may output the result of the determination only when the mobile terminal 10*a* is the subject to be charged, or may output not only the result of the determination regarding the connection network but also the voice and the image which issue the notices that the mobile terminal 10*a* is the subject to be charged. Moreover, the speaker 14 and the display 15 may output only the result of the determination for the connection network of the mobile terminal 10*a* itself, or may output the results of the determinations for the connection networks of the mobile terminal 10*a* and the terminal of the other end.

The notification unit 13 issues the notice, to the terminal of the other end, on the communication network to which the radio unit 11 is connecting. The notification unit 13 creates the control signal for issuing the notice on the connection network of the radio unit 11, and transmits the control signal concerned to the terminal of the other end through the radio unit 11. The notification unit 13 creates the control signal upon detecting the switching of the connection network, and issues the notice on such a change of the connection network to the terminal of the other end.

Figure 4:
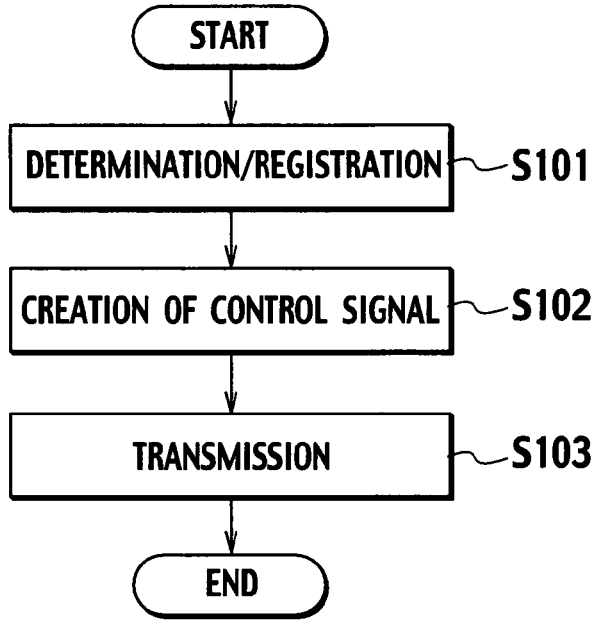
FIG. 4 is a flowchart showing an operation procedure of the management server according to the embodiment of the present invention.

Next, an operation procedure of the management server 20 is shown in FIG. 4. The determination unit 22 determines the connection networks of the mobile terminals 10*a* to 10*d*, and registers the results of the determinations in the communication information storage unit 24 (S101). The determination unit 22 creates the control signals for issuing the notices on the connection networks to the mobile terminals 10*a* to 10*d* with reference to the communication information storage unit 24 (S102). The I/F 21 transmits the created transmission signals to the mobile terminals 10*a* to 10*d*, and issues the notices on the connection networks thereto (S103).

Figure 5:
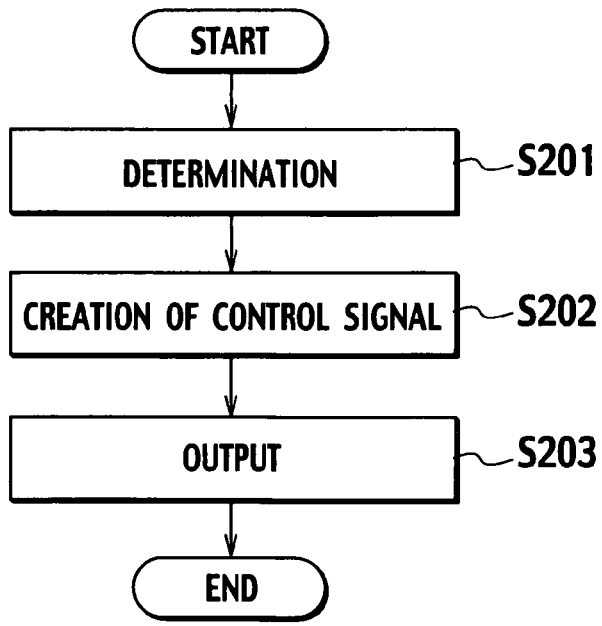
FIG. 5 is a flowchart showing an operation procedure of the mobile terminal according to the embodiment of the present invention.

An operation procedure of each of the mobile terminals 10*a* to 10*d* is shown in FIG. 5. The determination unit 12 determines the connection network of the radio unit 11 and the connection network of the terminal of the other end (S201). The determination unit 12 creates the control signal representing the result of the determination, and inputs the control signal to the speaker 14 and the display 15 (S202). The speaker 14 and the display 15 output the result of the determination as the voice and the image (S203).

As described above, the management server 20 includes the determination unit 22 for determining the communication network to which the mobile terminal connectable to the plural communication networks by one telephone number is connecting, and the notification unit 23 for issuing the notice on the communication network connecting to the mobile terminal based on the result of the determination by the determination unit 22. With such a configuration, the notices on the communication networks (connection networks) to which the mobile terminals 10*a* to 10*d* each of which is connectable to the plural communication networks by one telephone number are connecting at present can be issued thereto. Accordingly, the users of the mobile terminals 10*a* to 10*d* can grasp the communication networks to which the mobile terminals 10*a* to 10*d* are connecting at present.

In particular, the determination unit 22 can detect at least one of the fact that each mobile terminal has connected to the communication network and the fact that the mobile terminal has switched the communication network to which the mobile terminal concerned is connecting. Moreover, when at least one of the fact that the mobile terminal has connected to the communication network and the fact that the mobile terminal has switched the communication network to which the mobile terminal concerned is connecting has been detected by the determination unit, the notification unit 23 can issue the notice on the detected fact to the mobile terminal concerned. With such a configuration, when the mobile terminals 10*a* to 10*d* have connected to the communication networks and have switched the connection networks owing to the movements thereof, the deterioration of the radio wave conditions, and the like, the management server 20 can issue the notices on the communication networks connecting to the mobile terminals 10*a* to 10*d* at present.

Moreover, the determination unit 22 can determine the mobile terminal as the subject to be charged, and the notification unit 23 can issue the notice, to the mobile terminal as the subject to be charged, that the mobile terminal concerned is the subject to be charged. With such a configuration, the management server 20 can issue the notice on the communication network connecting to the mobile terminal as the subject to be charged at present. Hence, the user can grasp that the mobile terminal of his/her own is the subject to be charged, and can make the communication with peace in mind.

Moreover, each of the mobile terminals 10*a* to 10*d* includes the radio unit 11 connectable to the plural communication networks by one telephone number and for making the wireless communication, the determination unit 12 for determining the communication network to which the radio unit is connecting, and the output units (speaker 14 and display 15) for outputting the result of the determination by the determination unit 12. With such a configuration, when each of the mobile terminals 10a to 10d is connectable to the plural communication networks by one telephone number, each of the mobile terminals 10a to 10d can determine the communication network to which the mobile terminal concerned is connecting at present, and can output the result of the determination to the speaker 14 and the display 15. Therefore, the users of the mobile terminals 10a to 10d can grasp the connection networks.

In particular, the determination unit 12 can detect at least one of the fact that each mobile terminal has connected to the communication network and the fact that the mobile terminal has switched the communication network to which the radio unit is connecting. Moreover, when at least one of the fact that the radio unit 11 has connected to the communication network and the fact that the radio unit 11 has switched the communication network to which the radio unit 11 is connecting has been detected by the determination unit 12, the output units (speaker 14 and display 15) can output the detected fact. With such a configuration, each of the mobile terminals 10a to 10d can output the communication network to which each of the mobile terminals 10a to 10d is connecting at present to the speaker 14 and the display 15 when each of the mobile terminals 10a to 10d has connected to the communication network and has switched the connection network owing to the movement thereof, the deterioration of the radio wave conditions, and the like.

According to the management server 20 and the mobile terminals 10a to 10d, for example, even when the connections are established between the mobile terminals 10a to 10d and the mobile communication network 40 owing to the temporal deterioration of the radio wave conditions, and the like though the users of the mobile terminals 10a to 10d desire the connections to the wireless LAN (B) 50b on the flat rate basis, the mobile terminals 10a to 10d can correctly grasp the communication networks to which the mobile terminals 10a to 10d are connecting at present, and the subject to be charged.

Moreover, even when each of the mobile terminals 10a to 10d performs the handover to switch the connection from the wireless LAN (B) 50b to the mobile communication network 40 owing to the movement thereof, the deterioration of the radio wave conditions, and the like, each of the mobile terminals 10a to 10d can correctly grasp the communication network to which the mobile terminal concerned is connecting at present, and the subject to be charged.

Various modifications will become possible for those skilled in the art after receiving the teachings of the present disclosure without departing from the scope thereof.

What is claimed is:

1. A management server, comprising:
a determination unit configured to determine a communication network to which a receiving mobile terminal, which is a mobile terminal acting as a receiver of a call and which is connectable to a plurality of communication networks by one telephone number, is connecting; and
a notification unit configured to issue a first notice to the receiving mobile terminal based on a result of determination by the determination unit, wherein
the first notice is configured to indicate the communication network to which the receiving mobile terminal connects,
when the communication network to which the receiving mobile terminal connects is changed while the call is in progress, the determination unit is configured to determine that a subject to be charged for the call is changed from an originating mobile terminal, which is a mobile terminal acting as an originator of the call, to the receiving mobile terminal, and
the notification unit is configured to issue a second notice to the receiving mobile terminal when the subject to be charged is changed to the receiving mobile terminal, the second notice indicating that the subject to be charged for the call is changed from the originating mobile terminal to the receiving mobile terminal.

2. The management server according to claim 1, wherein
the plurality of communication networks, including a wireless LAN network and a mobile communication network, includes at least two communication networks with a basis of charge different for each, the basis of charge including an as-used basis of charge and a flat-rate basis of charge,
the determination unit determines the communication network to which the receiving mobile terminal connects and a second communication network to which the originating mobile terminal connects, the communication network may be a same communication network as the second communication network, and
the notification unit issues a third notice, which indicates both the communication network to which the receiving mobile terminal connects and the second communication network to which the originating mobile terminal connects, to the originating mobile terminal.

3. The management server according to claim 2, wherein
the determination unit detects that the communication network to which the receiving mobile terminal connects or the second communication network to which the originating mobile terminal connects is changed, and
when the determination unit detects that the communication network to which the mobile terminal as the call receiver connects or the second communication network to which the mobile terminal as the call originator connects is changed based on the detection, the notification unit issues the third notice to the originating mobile terminal.

4. The management server according to claim 2, wherein the notification unit controls notices to be output by a method compatible with the connection network to which the receiving mobile terminal connects and the second communication network to which the originating mobile terminal connects.

* * * * *